United States Patent Office 3,191,144
Patented June 22, 1965

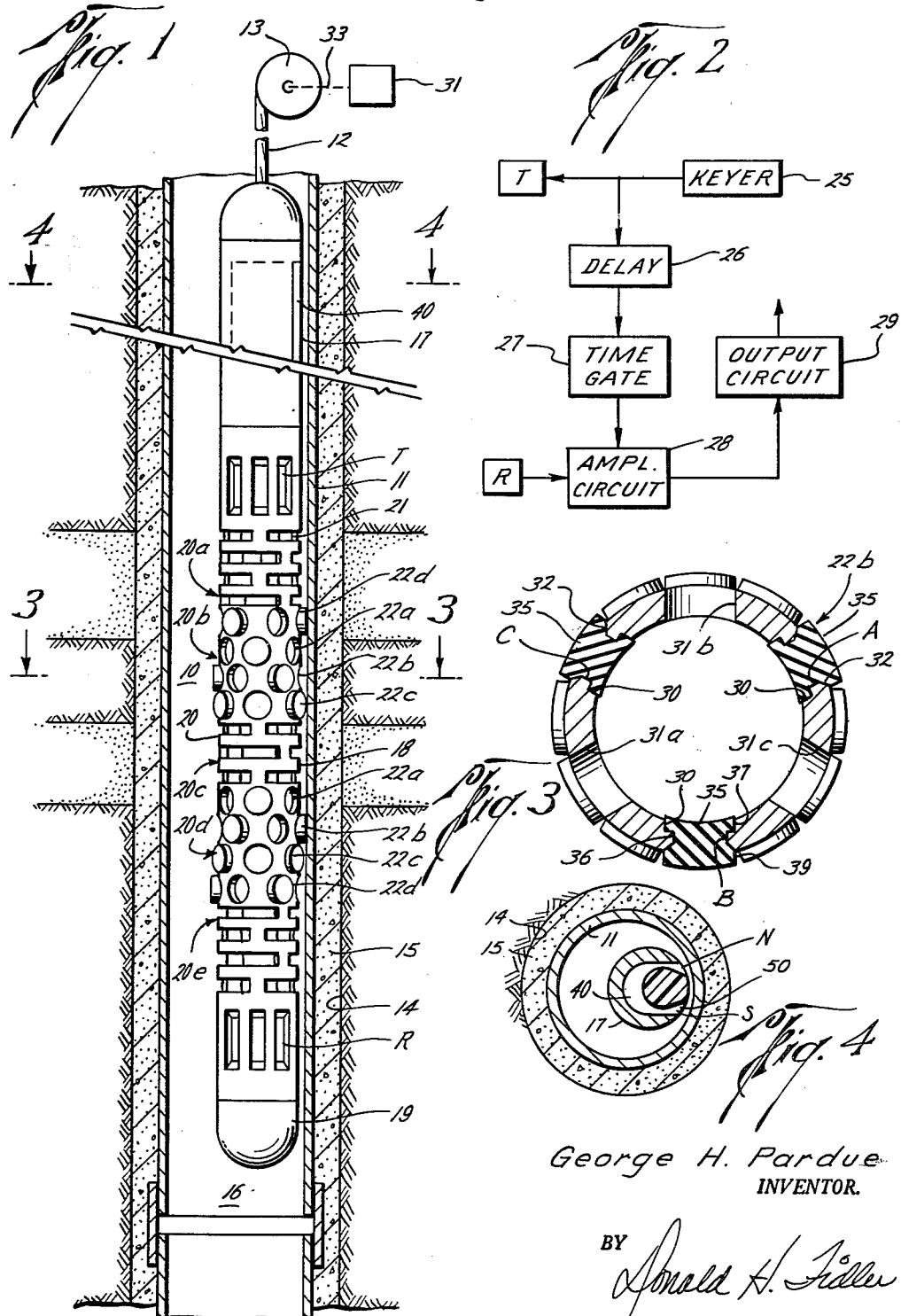

3,191,144
STAND OFF APPARATUS FOR LOGGING TOOL
George H. Pardue, Houston, Tex., assignor to Schlumberger Well Surveying Corporation, Houston, Tex., a corporation of Texas
Filed Aug. 8, 1961, Ser. No. 130,060
8 Claims. (Cl. 340—17)

The present invention relates to acoustic logging apparatus for use in well bores and, more particularly, to acoustic apparatus for use in the investigation of the nature of acoustic coupling between a casing and materials disposed to the exterior of the casing.

In a typical well completion operation, a casing is positioned in the borehole and cement is pumped into the annulus defined between the casing and borehole. For various reasons, the cement may fail to completely fill the annulus along the length of the casing, which often results in a condition generally known as "channeling." Moreover, part or portions of the column of cement may fail to bond to the casing or formations and portions of the cement may fail to "set" due to contamination from drilling mud or other fluids. In such instances, fluids and/or gases from formations at other depths may migrate along the imperfections in the column of cement. Thus, if a production sand is "completed" as by perforation in a zone which includes such imperfections, migrating fluids and/or gases from other earth formations may impair the production of hydrocarbons from the sand. In zones where the cement is set properly and bonded to the casing, it has been found that an acoustic pulses transmitted through the casing will be greatly attenuated so that, with suitable apparatus, the bonded zones can be distinguished from the unbonded zones.

In another typical instance of recovery operations for a "stuck" drill pipe, casing or the like it is important to know where the pipe is embedded by the earth formations. In many instances the packing of earth formations about the pipe is acoustically analogous to the conditions of a cement bonded pipe in that an acoustic signal is attenuated by the earth formations which are in contact with the casing.

It has been proposed to measure the acoustic coupling of materials to the pipe string in the borehole, either the quality of the cement bond or the degree of packing earth formations about the casing, by inspecting for a preselected time the amplitude of a sonic signal arriving at a receiver at a predetermined time. To do this it is necessary that the spacing or stand off of the acoustic apparatus relative to the casing be constant.

Accordingly, it is an object of the present invention to provide new and improved apparatus for providing a constant stand off for an acoustic tool relative to a casing.

In the apparatus embodying the present invention a relatively rigid housing is provided with stand off plugs disposed about the periphery of the housing. The stand off plugs have outer curved surfaces which are spaced a given distance from the outer surface of the housing and are constructed of an elastomer material. A magnetic device is provided in the upper end of the housing to magnetically latch the housing relative to the casing thereby to offset undesirable forces on the cable which might tilt the upper end of the housing away from the casing.

The novel features of the present invention are set forth with particularity in the appended claims. The present invention, both as to its organization and manner of operation together with further objects and advantages thereof, may best be understood by way of illustration and example of certain embodiments when taken in conjunction with the accompanying drawings in which:

FIG. 1 is a schematic view of apparatus embodying the present invention disposed in a well bore;

FIG. 2 is a schematic representation of circuitry embodied in the present invention;

FIG. 3 is a view of the apparatus only taken along line 3—3 of FIG. 1; and

FIG. 4 is a view taken along line 4—4 of FIG. 1.

Referring now to FIG. 1, apparatus which embodies the present invention is indicated generally by the numeral 10 and is adapted to be suspended in a casing 11 by means of a cable 12 and a winch 13 located at the earth's surface. The cable and winch serve to lower and raise the apparatus 10 through the casing in a conventional manner. Casing 11 is disposed in a borehole 14 and suitably cemented thereto by a column or body of cement 15. Casing 11 also is filled with a fluid 16 such as water or a drilling mud.

Apparatus 10 generally includes an upper head section 17, a main section 18 and a lower nose section 19. Section 17 has fluid tight compartments for containing the electrical components of the apparatus while the main section 18 contains longitudinally spaced transducers which, for example, may be a conventional magnetostrictive transmitter T and receiver R. The lower nose section 19 may contain a conventional device for magnetically indicating casing collars.

The transmitter T and receiver R are spaced a fixed distance from one another and acoustically isolated from one another by any suitable rigid configuration with a characteristic low acoustic velocity or a high acoustic impedance so that acoustic energy first arriving at the receiver R is that which travels through the adjacent higher velocity media and not the acoustic energy travelling through the spacing arrangement or fluid in the casing. As shown in FIG. 1, the spacing arrangement for the transducers is shown to be a rigid housing 20 with apertured sections 20 (a–e) disposed between the transmitter T and receiver R. Sections 20a, 20c, 20e include transverse slots in spaced longitudinal planes which are staggered relative to one another to alter the travel of acoustic energy lengthwise of the housing. Sections 20b and 20d contain cylindrical openings 21 which have a sufficient diameter and spacing about the periphery to break up longitudinal paths lengthwise of the housing and thereby alter the travel of acoustic energy.

In general, as the apparatus 10 is passed through the casing, the transmitter T is periodically energized by a sharp pulse of electrical energy to produce a sharp pulse of acoustic energy which is emitted by the transmitter. The significant acoustic energy herein under consideration passes through the fluid to the casing, along the casing and subsequently passes through the fluid to the receiver. In the absence of cement bonding to the casing there is relatively little attenuation of the acoustic energy. However, if the cement column is present and bonded to the casing, the acoustic energy is greatly attenuated, apparently due to dissipation of the acoustic energy by the loading of the cement column on the casing.

To operate the electrical portion of the device, a source of alternating current (not shown), for example, 60 cycles A.C., at the earth's surface can be coupled via the cable 12 to a conventional power supply (not shown) in the apparatus 10 to supply the operating potentials for the various electrical components of the apparatus. The electrical circuitry for the apparatus 10 as shown in FIG. 2 may include a conventional keyer circuit 25 coupled to the transmiter T to produce repetitive sound pulses. The keyer circuit 25 also may supply a trigger pulse to a conventional delay circuit 26 which delay circuit, after a selected predetermined time, actuates a conventional time gate circuit 27. The time gate circuit 27 which may typically be a monostable multivibrator, when actuated provides a control pulse for a predetermined time interval which conditions an amplitude circuit 28 for operation during such predetermined time interval.

The receiver R is coupled to the amplitude circuit 28 so that the amplitude of the portion of the electrical signal generated by the receiver R in response to acoustic energy arriving at the receiver during the predetermined time interval is passed to a suitable output circuit 29. Circuit 28 is arranged to develop an output signal representative of the amplitude of the portion of the electrical signal occurring during the predetermined time interval. The output signal from circuit 28 is, in turn, coupled to a conventional output circuit 29 for transmittal to the surface via cable 12 to conventional surface indicating means 31 (FIG. 1) such as a recorder.

The recorder 31 at the earth's surface is mechanically driven in a well-known manner by a drive connection (indicated by the dashed line 33) to the winch 13 so as to be responsive to travel of the cable and so that the output signals of the output circuit 29 are recorded against a depth base as the apparatus 10 is passed along the casing.

The control pulse of the time gate circuit 27 may have a time duration which is substantially equal to the time interval for a half cycle of an acoustic pulse. This control pulse may be initiated at a preselected time relative to the expected arrival of the acoustic energy at the receiver. It is in this connection that the spacing of the apparatus from the casing becomes significant.

By way of illustration, the shortest time in which acoustic energy can travel from the transmitter to the receiver is determined by the spacing between the transmitter and receiver, the stand off distance of the apparatus from the casing and the respective velocities of the casing and the well bore fluid. As will be appreciated, a relatively constant stand off distance is necessary to provide a constant time path to permit accurate timing of gate 27.

Turning now to the features of the present invention, in the respective housing sections 20b and 20d there are four longitudinally displaced groups 22(a–d) of openings. Since each of the sections 20b and 20d is similarly arranged, a description of one section will suffice for the others. In the embodiment illustrated, in housing section 20b, each of the groups (22a–d) of openings 22 is comprised of six openings equidistantly spaced about the periphery of the housing so that the centers of the respective openings are spaced relative to one another by an angle of 60 degrees (see FIG. 3). The diameter of the respective openings in each of the groups of openings is slightly larger than the distance or spacing between adjacent openings.

Each group 22(a–d) of openings is indexed at an angle of 30 degrees relative to an adjacent group so that longitudinal interconnecting paths lengthwise of the housing are substantially tortuous. As shown in FIG. 3 in a typical group 22b of openings, three of the openings A, B and C which are disposed at 120 degrees relative to one another have interior counter-bores 30 with a diameter similar to respective diametrically opposed openings 31(a–c). Openings A, B and C each have exterior beveled surfaces 32. Received in the three specified openings A, B and C are stand off members 35 which are constructed of a relatively stiff elastomer material. The stand off members 35 are generaly cylindrical with a spool or grommet type of configuration wherein a grooved center portion 36 of a stand off member is received within one of the specified openings A, B or C with flanged ends 37 and 39 of the stand off member resiliently but securely holding the stand off member fixed in position in the housing. The outer or exterior surfaces of the stand off members 35 are, of course, suitably rounded so that a constant spacing of the apparatus from the casing wall is provided regardless of the angular orientation of the apparatus. As shown in FIG. 1, the four groups of openings 22(a–d) for the grommet-like plugs 35 are displaced 30 degrees with respect to each other so that the plugs 35 provide a complete circumferential stand off (see FIG. 3).

In the upper section 20b, the displacement between groups of openings is made in a manner similar to a left-hand screw pitch while in the lower section 20d the displacement is made in a right-hand pitch to counteract any tendency of the plugs to cause rotation of the tool.

The stand off sections 20b and 20d are, of course, spaced relative to one another and the balance of the housing to permit the housing to be uniformly spaced from the well bore without tilting. However, to insure the fiidelity of a constant stand off spacing of the housing relative to the casing along its length, the uppermost end of the housing adjacent to the cable connection is provided with a permanent magnet 40. The magnet 40 (FIG. 4) has longitudinally extending north (N) and south (S) poles which magnetically couple to the casing with sufficient force to off-set any component of force that the cable 12 may exert on the housing tending to separate the upper end of the housing from the casing. In other words, the magnet 40 prevents tilting of the housing due to side pull effects or forces on the cable. It will be appreciated, of course, that these cable pulling effects occur by virtue of the inherent inclination of sections of the casing relative to a vertical.

While a particular embodiment of the present invention has been shown and described, it is apparent that changes and modifications may be made without departing from this invention in its broader aspects, and therefore the aim in the appended claims is to cover all such changes and modifications as fall within the true spirit and scope of this invention.

What is claimed is:

1. Logging apparatus for use in a well bore comprising: a rigid cylindrical housing, said housing having along its length a perforated section including perforations disposed about the periphery of the housing, and plug means sized for retention in said perforations and disposed in perforations about the periphery of said housing, said plug means having outer contact surfaces uniformly spaced from the outer wall of said housing, said plugs being spaced about the periphery of said housing with both a left and right hand spiral arrangement to prevent rotation of said housing.

2. Acoustic logging apparatus for use in a cased well bore comprising: an elongated housing, at least two acoustic transducers fixed relative to said housing, said housing being adapted to be coupled at its upper end to a cable, and magnet means in said upper end of said housing for magnetically attracting the upper end of said housing towards a casing, and stand off means disposed along the length of said housing and about the periphery of said housing with extremities disposed a uniform distance outwardly from said housing to space said housing from the wall of a casing.

3. Acoustic logging apparatus for use in a cased well bore comprising: an elongated housing, at least two acoustic transducers fixed relative to said housing, said housing being adapted to be coupled at its upper end to a cable, and magnet means in said upper end of said housing for magnetically attracting the upper end of said housing towards a casing, said housing having along its length a perforated section including perforations disposed about the periphery of the housing, said perforations being disposed intermediate of said transducers, and plug means sized for retention in said perforations and disposed in perforations about the periphery of said housing, said plug means having outer contact surfaces uniformly spaced from the outer wall of said housing.

4. Acoustic logging apparatus for use in a cased well bore comprising: an elongated housing, at least two acoustic transducers fixed relative to said housing, said housing being adapted to be coupled at its upper end to a cable, and magnet means in said upper end of said housing for magnetically attracting the upper end of said housing towards a casing, said housing having along its length a perforated section including perforations disposed about the periphery of the housing, said perforated section being disposed intermediate of said transducers, and elastomer plug means sized for retention in said perforations and disposed in perforations about the periphery of said housing, said plug means having outer contact surfaces uniformly spaced from the outer wall of said housing.

5. An exploratory probe arranged for passage through a cased well bore including a tubular member comprised of steel and having perforations along its length operable to substantially alter the travel of acoustic impulses therealong, acoustic transducer means supported in a fixed, spaced apart relationship relative to said tubular member including a transmitter means and at least one receiver means disposed above and below the lengths of housing having perforations and operable for probing the materials surrounding the well bore with acoustic impulses and means coupled to said transducer means for developing a signal output representative of the sonic parameters as determined from the acoustic impulses, means in said perforations for spacing said tubular member a fixed distance from the wall of the well bore.

6. The apparatus as defined in claim 5 wherein said spacing means are elastomer plugs spaced about the periphery of said tubular member with both a left and right hand spiral arrangement to prevent rotation of said tubular member.

7. The apparatus as defined in claim 5 wherein a permanent magnet means is secured to the upper end of said tubular member.

8. A well tool for use in a cased well bore comprising: an elongated, cylindrically shaped housing, said housing being adapted to be coupled at its upper end to a cable for movement through the well bore, magnet means in said upper end of said housing for magnetically attracting the upper end of said housing towards a casing, and stand off means disposed along the length of and about the periphery of said housing with extremities disposed a uniform distance outwardly from said housing, said magnet means being magnetically coupled to the casing with a force sufficient in conjunction with said stand off means to maintain said housing including said magnet means uniformly spaced from said casing by said uniform distance.

References Cited by the Examiner

UNITED STATES PATENTS

| 2,425,868 | 8/47 | Dillon | 181—0.53 |
| 2,530,308 | 11/50 | Martin | 181—0.53 X |
| 2,938,592 | 5/60 | Charske et al. | |
| 3,015,063 | 12/61 | Ownby | 324—47 X |

BENJAMIN A. BORCHELT, *Primary Examiner.*

SAMUEL FEINBERG, CHESTER L. JUSTUS,
*Examiners.*

---

UNITED STATES PATENT OFFICE
CERTIFICATE OF CORRECTION

Patent No. 3,191,144            June 22, 1965

George H. Pardue

It is hereby certified that error appears in the above numbered patent requiring correction and that the said Letters Patent should read as corrected below.

Column 1, line 32, for "pulses" read -- pulse --; line 43, for "propesed" read -- proposed --; column 5, line 15, for "lengths" read -- length --.

Signed and sealed this 21st day of December 1965.

(SEAL)
Attest:

ERNEST W. SWIDER            EDWARD J. BRENNER
Attesting Officer            Commissioner of Patents

UNITED STATES PATENT OFFICE
CERTIFICATE OF CORRECTION

Patent No. 3,191,144

June 22, 1965

George H. Pardue

It is hereby certified that error appears in the above numbered patent requiring correction and that the said Letters Patent should read as corrected below.

Column 1, line 32, for "pulses" read -- pulse --; line 43, for "propesed" read -- proposed --; column 5, line 15, for "lengths" read -- length --.

Signed and sealed this 21st day of December 1965.

(SEAL)
Attest:

ERNEST W. SWIDER
Attesting Officer

EDWARD J. BRENNER
Commissioner of Patents